(12) United States Patent
Le Van Suu

(10) Patent No.: US 6,347,308 B2
(45) Date of Patent: *Feb. 12, 2002

(54) METHOD FOR THE PROCESSING OF INFORMATION BY FUZZY LOGIC

(75) Inventor: Maurice G. Le Van Suu, Romainville (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,221

(22) Filed: Apr. 8, 1998

(30) Foreign Application Priority Data

Apr. 8, 1997 (FR) .............................................. 97 04284

(51) Int. Cl.$^7$ ............................................... G06F 15/18
(52) U.S. Cl. ................................ 706/4; 706/3; 706/900
(58) Field of Search .................................. 706/4, 3, 900

(56) References Cited

U.S. PATENT DOCUMENTS

| | | | | |
|---|---|---|---|---|
| 4,961,225 A | * | 10/1990 | Hisano ........................ | 706/900 |
| 5,051,932 A | | 9/1991 | Inoue et al. .................... | 707/5 |
| 5,249,269 A | * | 9/1993 | Nakao et al. ................ | 706/900 |
| 5,252,789 A | * | 10/1993 | Sirag, Jr. et al. ............ | 187/385 |
| 5,267,348 A | * | 11/1993 | Someya et al. ............. | 706/900 |
| 5,363,023 A | * | 11/1994 | Choho .......................... | 318/70 |
| 5,561,738 A | * | 10/1996 | Kinerk et al. .................. | 706/4 |

(List continued on next page.)

FOREIGN PATENT DOCUMENTS

EP          0 385 387 A2     2/1989

OTHER PUBLICATIONS

Dörsam et al, "Fuzzy–Based–Force–Adaptation for Multifingered Robot Hands", IEEE Proceeding of the 3rd Conference on Fuzzy Systems, Jun. 1994.*

Lever et al, "A Fuzzy Control System for an Automated Mining Excavator", IEEE International Conference on Robotics and Automation, May 1994.*

Nitta et al, "A High Performance Fuzzy Inference Processor and its Evaluation System", Proceedings of 1995 IEEE Interational Conference on Fuzzy Systems, 1995, International Joint Conference of the 4th IEEE Internationl Conference on Fuzzy Systems and the 2nd Inter–Fuzzy Engineering Symposium.*

Patent Abstracts of Japan, vol. 15, No. 16, (p. 1152) Jan. 14, 1991, JP 02259906.

M. Mizumoto, "State Dependent Fuzzy Controls by Fuzzy Singleton–Type Reasoning Method", *Soft Computing in Intelligent Systems and Information Processing*, Proceedings of the 1996 Asian Fuzzy Systems Symposium (Cat. No. 96TH8239).

Thomas Tilli, "Fuzzy–Logik in der Elektronik Teil 3: Ablaufsteuerungen", *Elektronik*, vol. 43, No. 24 (Nov. 29, 1994).

*Primary Examiner*—George B. Davis
(74) *Attorney, Agent, or Firm*—Lisa K. Jorgenson; Allen, Dyer, Doppelt, Milbrath & Gilchrist, P.A.

(57) ABSTRACT

In a system of information processing by fuzzy logic, force coefficients are associated with values of variables processed by a fuzzy logic processor. The force coefficients show the degree of urgency with which information sent has to be taken into consideration or indicating the imperative nature of this information. In a network structure, this force coefficient is incorporated into address signals conveyed on the network. Then, in the membership function memories of the fuzzy logic processors, there are memories that take account of the classes of addresses for the extraction therefrom of the character of urgency of the information elements concerned.

44 Claims, 1 Drawing Sheet

U.S. PATENT DOCUMENTS

| | | | |
|---|---|---|---|
| 5,655,056 A | * 8/1997 | Takaka et al. | 706/900 |
| 5,671,138 A | * 9/1997 | Bessacini et al. | 706/900 |
| 5,687,290 A | * 11/1997 | Lewis | 706/900 |
| 5,706,193 A | * 1/1998 | Linzenkirchner | 706/900 |
| 5,720,005 A | * 2/1998 | Goke et al. | 706/900 |
| 5,731,868 A | * 3/1998 | Okey et al. | 356/73 |
| 5,758,025 A | * 5/1998 | Wu | 706/3 |
| 5,758,031 A | * 5/1998 | De Silva | 706/52 |
| 5,956,464 A | * 9/1999 | Madni et al. | 706/900 |

* cited by examiner

METHOD FOR THE PROCESSING OF INFORMATION BY FUZZY LOGIC

FIELD OF THE INVENTION

The present invention is directed to the field of information processing, and, more particularly, to the field of information processing using fuzzy logic.

The invention relates to electronic systems in which the management of information is particularly complex and cannot typically be processed analytically, although the invention could also be applied in these systems. Furthermore, the invention is especially useful for systems organized in networks for it provides greater flexibility in processing.

BACKGROUND OF THE INVENTION

A method for processing of information in fuzzy logic comprises, first, the assessment of the likelihood of the membership of the value of a variable in membership functions of this variable and, second, the preparation of elementary decision signals for the application of rules of the type "if a given variable belongs to a given membership function, then the elementary decision signal will be equal to a given result". At the end of processing, a combination of the different elementary signals is used to obtain a processed result that is applicable to an activation element or actuator of the system.

The units of such a system which send out signals representing variables are chiefly detectors that are independent or placed directly on an actuator unit, setting units such as a keyboard, or a master processor that takes control of the system to force it to act in a specified way. The actuators are generally drive units (electrical motors, remote control relays or even display screens). The actuators may nevertheless be a part of the detector itself, for example, its address register, when this register is modified as a function of an assignment that is dictated to it by a processor of the system. This is why the term "transmitter" is used herein, since a detector can be partly an actuator and an actuator can be partly a detector. In other words, a transmitter unit is a unit that transmits information to another unit, to at least one fuzzy logic processor.

One example of a system managed according to a fuzzy logic information processing method is a system of surveillance against intrusion. In such a system, there are presence detectors to detect the presence of a unauthorized individual inside a room under surveillance. Coupled with this detection, there may also be a temperature detection system to report, for example, the occurrence of a fire.

With regard to presence detectors, there are known ways of using frequency modulation detectors to recognize the presence of an object or a person moving in a space under surveillance. However, if the moving object is insignificant such as, for example, a butterfly passing before a detector or a cat going under a grating, it is important that no untimely alarm should be triggered. To resolve these problems, a local information-filtering system has already been provided. For example, if a presence detector has detected a presence at a given time and no longer detects it thereafter (because the butterfly has gone out of the field of the detector), then the local filters are adjusted so that no alarm is transmitted. The filters may include operations that are themselves complex.

Furthermore, especially when the system is in a network, there may be many information elements to be processed, and preference has to be given to certain information elements as compared with others. Thus, it is possible to conceive of a situation where it is very important to react swiftly when there is a crossing of a temperature that indicates a fire at a certain place while, at the same time, simple operations of management also have to be performed, but with a smaller degree of urgency.

In the prior art, there is no solution to this problem. Either the filtering is done locally and information elements are transmitted only if they are sufficiently serious or else all the information elements are processed one after the other with the consequences of delay that this might entail.

SUMMARY OF THE INVENTION

An object of the present invention is to overcome the problem that filtering is typically done locally and information elements are transmitted only if they are sufficiently serious or else all the information elements are processed one after the other with the consequences of delay that this might entail.

The invention is aimed at overcoming this problem by recommending the dispatch, at the same time as the information to be processed, of a force coefficient, the term "force coefficient" being a generic term that quantifies the importance of the information transmitted. For example, in the case of the butterfly that penetrates the field of the detector, on the one hand an information element could be sent reporting the fact that a detection has taken place and, on the other hand, by way of a force coefficient, a value of a variable could be sent, this value being greater as the information itself is significant. To put it simply, the force coefficient could be proportional to the time that the butterfly remains in the field of the detector.

In the other example, the force coefficient, rather than being measured prior to its transmission, may be set definitively: temperature sensors or fire detectors are provided with a maximum force coefficient, and all the other logistical operations may be provided with a smaller force coefficient.

The present invention is directed to a method of processing information by fuzzy logic. More particularly, the method preferably comprises the following steps:

data elements are sent from the transmitters to at least one fuzzy logic processor;

the fuzzy logic processor processes the data elements sent on the basis of membership functions and on the basis of conditional rules, and the fuzzy logic processor produces a processed signal, wherein:

data elements are sent to the fuzzy logic processor in common with a force coefficient of these data elements; and the fuzzy logic processor weights the signal processed by this force coefficient.

As shall be seen hereafter, the invention is furthermore preferably put into operation in the context of a use in a network. In an installation of this kind, each detector or actuator reports itself by its address. According to one advantage of the invention, the force coefficient is incorporated into the address sent by the transmitter and corresponding address classes are organized.

BRIEF DESCRIPTION OF THE DRAWINGS

The invention will be understood more clearly from the following description and with reference to the accompanying figures. These figures are given purely by way of an indication and in no way restrict the scope of the invention. Of these figures.

DETAILED DESCRIPTION OF THE PREFERRED EMBODIMENTS

Figure 1:
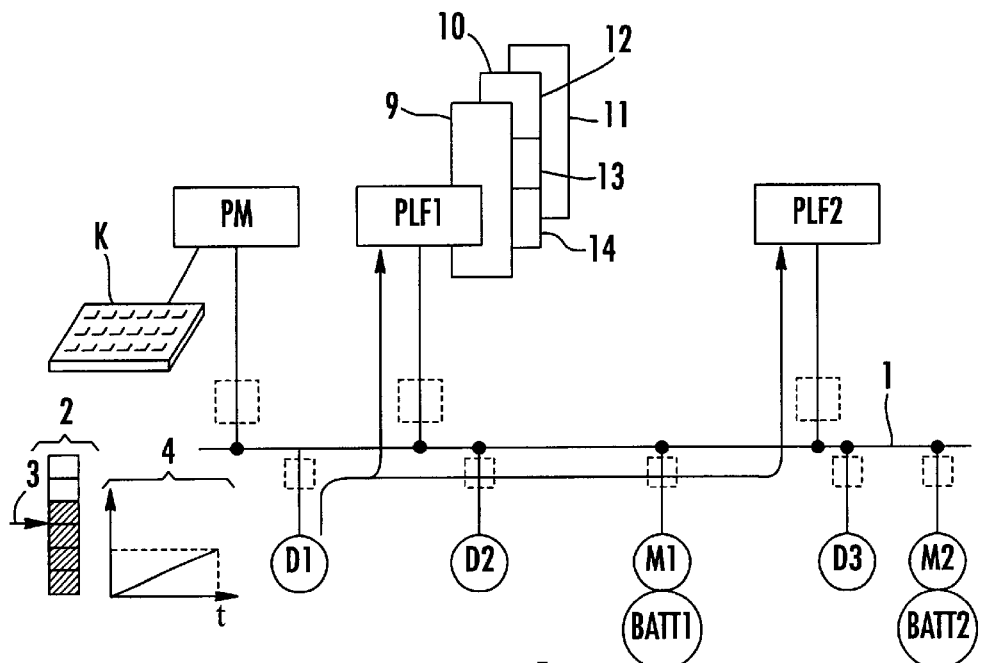
FIG. 1 gives a schematic view of a network, especially a home automation network, used to implement the method of the invention.

FIG. 1 shows a network system that can be preferably used to implement the method of the invention. In this system, the figure shows essentially a transmission channel 1 of the network. The channel 1 enables the connection of the detectors D1, D2, D3 to fuzzy logic processors PLF1, PLF2, as well as to actuator units (or motors) M1 or M2. As a variant, the actuators are batches of batteries BATT1 and BATT2 that are in the course of being charged by connection to the electrical mains. The monitoring of these batches of batteries is thus organized. The fuzzy logic processors PLF1 and PLF2 may furthermore be directly connected to the actuators, the motors M1 and M2, that they control respectively. However, it is also possible for them to be connected, to these motors by means of the channel 1.

The channel 1 may be a radio frequency channel, using infrared, acoustical or twisted pair means. It is preferably a carrier current type of channel. Each of the units designated is connected to this channel 1 by an interface represented schematically in each case by a small rectangle of dashes. In a previous patent application Ser. No. 97 01897 filed on Feb. 18, 1997, a method and device have been described which would render the interfaces unnecessary. The fuzzy logic processors PLP1, PLF2, directly attached to the actuators, are capable, although they are not built for this purpose, of processing all the operations of the interface with the network.

The advantage of building a network with all these units is, of course, that it is possible to position each of them in the most appropriate position, where it will be best protected or most efficient.

The figure also shows a master processor PM whose role is to make it possible to set the parameters of the units of the network, especially by means of a keyboard K. The function of the processor PM shall be described further below. The processor PM is connected to the network with the same means as the other units.

A detector, for example, the detector D1, produces an information element 2 whose value depends on a measurement made by this detector. For example, if the detector is a presence detector, it produces a signal whose value is located above or below a threshold 3. In the invention, rather than sending the information element 2 only if it crosses the threshold 3, it is decided to send a force coefficient 4 in addition to the information element 2 (the local filtering is therefore eliminated). The force coefficient may, as shown schematically, be the result of an integration, in an integrator of the detector D1, of the information element 2 available in the detector D1.

As indicated above, the force coefficient may also be imposed on the sensor. For example, a temperature sensor positioned in a room where dangerous products are stored will be assigned a high force coefficient, while another sensor, located at a place that is less dangerous, will be assigned a lower force coefficient. In both cases, this force coefficient will not be measured, but will be set by construction. In another case concerning the processor PM, the force coefficient will be set up by an action carried out on the keyboard K or a program performed by this processor PM.

According to the invention, the data elements 2 and the force coefficients 4 are sent to the fuzzy logic processor PLF1 and PLF2 so that these processors carry out their processing accordingly. The transmission of the information element 4 in addition to the information element 2 to the fuzzy logic processor PLF1 and PLF2 may be organized in numerous ways. For example, the detector D1 alternately sends the type 2 information and the type 4 information systematically. The processors PLF1 and PLF2, once they are synchronized, are capable of recognizing them and of processing them accordingly.

Figure 2:
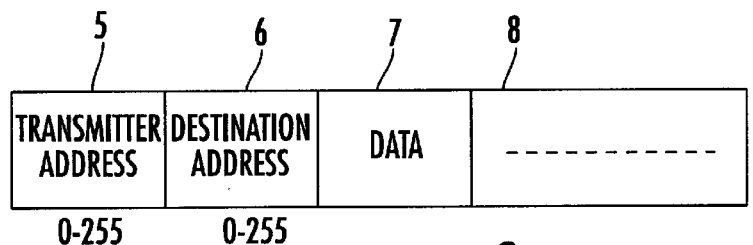
FIG. 2 shows a schematic drawing of a signal transmitted on the network of FIG. 1.

Preferably, as shown in FIG. 1, the detectors and all the other units are mounted in a network. In this case, since the transmission channel 1 is unique, at least on a part, it is important that each unit should make transmission on the network by sending a message represented for example in FIG. 2. A message of this kind, apart from the information for use by the interfaces enabling it to be opened, comprises an information element 5 representing the address, in the network, of the unit transmitting the information. The message also includes an information element 6 representing the address of the unit for which the information is intended, and data elements 7 representing information to be transmitted, especially the information element 2. The message may furthermore comprise other parts 8 designed for various purposes, especially for acknowledging of receipt of a previous message or the like.

To simplify the explanation, it is assumed that the address of the transmitter will be encoded on a byte and will therefore correspond to a value ranging from 0 to 255. This is also the case with the destination address 6.

Figure 3A:
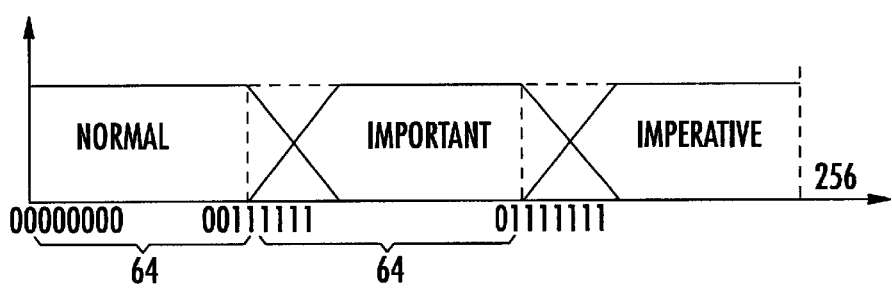
FIGS. 3a and 3b show modifications of address signals to incorporate the force coefficient of the invention.

FIG. 3a illustrates a preferred way of transmitting the force coefficient. In FIG. 3a, the force coefficient is incorporated into the transmitter address. In one example, there are only 64 possible origins for the information elements to be transmitted. Consequently, only six bits are needed to identify the origin of the information elements. On one byte, the forms of the starting addresses are therefore of the type 00000000 to 00111111. This method leaves unused the two most significant bits (or others) of the specified byte in the example.

According to the invention, it is then appropriate that, if the two most significant bits are at 00, the force coefficient has a normal character. If the two most significant bits, instead of being 00, are 01, it is assumed that the force coefficient indicates that the value of the information is important. Finally, if the two most significant bits are 10, or even 11, it is assumed that the information is of imperative value and necessitates processing that is firstly immediate and secondly unconditional. In doing so, three classes of addresses have been created for each address: the "NORMAL" class, the "IMPORTANT" class and the "IMPERATIVE" class.

It is clear that it would have been possible firstly to create more classes and secondly, especially by choosing more than one byte to designate the address, to have more than 64 units on the network. Thus, a transmission coming from the detector D1, whose address is, for example, 21, 00010101 in binary mode, will be considered to pertain to a normal transmission if the two most significant bits are 00. For the same address, but with most significant bits of the address that are different, the meaning of the data elements transmitted is that they will be deemed to be important or even imperative.

It is not necessary that the distinctive bits in the address of the force coefficient should be most significant bits. If they are, for example, the least significant bits, then for each unit of the network, there will be obtained N contiguous addresses that represent them. The number of bits used, to the power of 2, is equal to the number N.

Figure 3B:
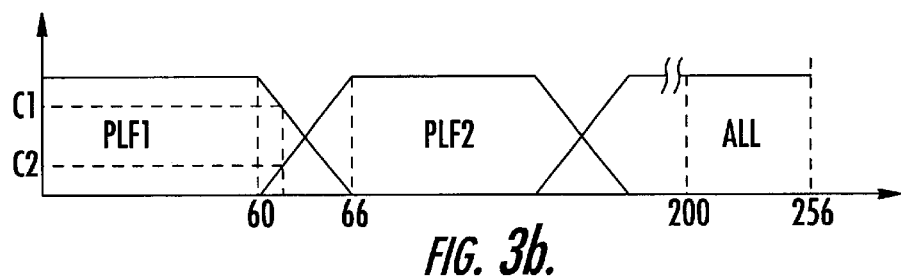

FIG. 3b gives a double view of the encoding of the force coefficient no longer in the address of the transmitter, but in the address of the destination unit. This is, for example, the case of the messages sent by the master processor PM. This master processor PM may send a message to the fuzzy logic processors PLF1 or PLF2. According to what has been indicated above, to designate the destination address, either an address corresponding solely to the processor PLF1 or another one corresponding to the processor PLF2 will be chosen.

If it is sought, with the processor PM, to control the processors PLF1 and PLF2 at the same time, an address common to these two processors will be used. As explained above, there may exist contiguous address zones to designate different units. In the present improvement, the address zones are no longer contiguous but are even overlapping. For example, if a destination address value ranging from 0 to 60 is assigned to the processor PLF1 and an address greater than 66 is assigned to the processor PLF2, it may be accepted that an address ranging from 61 to 65 may designate either of these two processors.

It is even possible, for these cases of overlapping, to provide for likelihood coefficients different from 1. In the example of FIG. 3b, there are provided likelihood coefficients, respectively C1 and C2, corresponding to a trapezoidal shape of the membership functions PLF1 and PLF2.

It is therefore possible, from any unspecified one of the units connected to the channel 1, to address one or more of the units connected to the channel 1. In the example of FIG. 3b, it is assumed for this purpose that if the destination address is, for example, greater than 200, it relates to all the units of the network. In this case, in each fuzzy logic processor, there is a membership function ALL stored in the memory that enables the message to be accepted.

Naturally, it is possible to couple the effects indicated with respect to FIG. 3a with those indicated with respect to FIG. 3b. Thus, the master processor PM may send an imperative message to one or more or all the other units of the channel 1. In this case, the notion of a force coefficient means alternatively the importance of the message or the groups of units to which it is addressed. As a variant, this force coefficient possesses both meanings.

A fuzzy logic processor, for example the processor PLF1, comprises a memory 9 of membership functions, as well as a memory 10 of rules. In the memory 9 of membership functions, tables are stored. In the example, these tables are tables receiving the address byte at input and delivering, at output, an information element representing, firstly, the membership function concerned (for example NORMAL, IMPORTANT or IMPERATIVE) and, secondly, an information element representing the membership coefficient of the variable measured at this membership function (for example, the coefficients C1 and C2).

For example, the address 21, for the detector D1, will have as a corresponding value in the table of membership functions of the memory 9, a meaning NORMAL with a membership coefficient 1 if the two most significant bits are 00, and a meaning IMPORTANT with a membership coefficient 1 if the two most significant bits are 01 and so on and so forth.

The rules stored in the memory 10, in their particular aspect pertaining to the invention, comprise conditions of the following type:

if the character of the message is NORMAL, then . . . , or if the character of the message is IMPORTANT, then . . . , or if the character of the message is IMPERATIVE, then . . .

With respect to FIG. 3b, in the memory 9 of the processor PLF1, normally it is only the membership function pertaining to the addresses designating PLF1 that will be recorded. This is so whether these addresses designate PLF1 are alone or are common to PLF1 and to any one of the other units connected to the network. The membership function pertaining to the generic addresses corresponding to the case where the message is distributed to all is also recorded in the memory 9 of the processor PLF. The rules of the memory 10 of the processor PLF1 then comprise rules of the type:

if address corresponding to PLF1, then . . .

The fuzzy logic processor PLF1 also comprises circuits 11 to weight the signals processed by the force coefficient received. In practice, the elementary results produced by the application of the rules of the memory 10 are composed in a circuit 11 according to at least two known modes. They may be formed, on the one hand, according to the product mode and, secondly, according to the mode of the minimum. In the product mode, all the membership coefficients implicated by a rule are multiplied with one another and elementary results are obtained. These elementary results are then summed with one another, and if necessary the mean is taken. In the mode of the minimum, the minimum of the coefficients of the membership functions implicated by a rule are taken as results of the rule. The sum thereof is then taken, and with the mean being taken or not taken.

In the case of weighting by the force coefficient according to the invention, it is possible, for example, if the imperative mode should be recognized, to choose to replace all these coefficients by a value 1: the command would have to be performed in any case without competition with other considerations. As a variant, it is possible to use the force coefficient as a direct weighting coefficient of the result that would have been obtained without the contribution of the invention. Any other means of combination can also be envisaged. In practice, for transmission with a normal character, the force coefficient could be equal to 1. It could be equal to 3 if it is important and to 10 if it is imperative.

Alternately, the weighting could even, as the case may be, imply the use of a first set of rules, a second set of rules, or a third set of rules designated by a force coefficient with three membership functions.

The invention may be implemented more particularly in the case of the above-mentioned patent application where the fuzzy logic processors work in two stages. At a first stage, they process the addresses (in particular to ascertain that the message is addressed to them). At a second stage, they process the data elements. In the case of the present invention, because the force coefficient is incorporated into the address, it is processed from the very beginning. This is appreciably advantageous, especially when a message has to be sent to all the units.

That which is claimed is:

1. A method of processing information by fuzzy logic comprising:

sending data elements with force coefficients from transmitters to at least one fuzzy logic processor where the force coefficients assign a relative importance to the data elements; and processing the data elements with the at least one fuzzy logic processor on the basis of membership functions, on the basis of conditional rules, and on the basis of weighting by the force coefficients to produce a processed signal.

2. A method according to claim 1, wherein the step of sending data elements is implemented in a network system.

3. A method according to claim 2, further comprising the step of:
sending an address to the at least one fuzzy logic processor which is an address of the transmitter that sends the data elements or an address of the designated fuzzy logic processor; and
encoding the transmitted address in classes of addresses so that this encoding represents the force coefficient.

4. A method according to claim 3, further comprising the step of:
distributing address membership functions as a function of the classes of addresses.

5. A method according to claim 1, wherein the processing step comprises weighting the processed signal by multiplying by the force coefficient.

6. A method according to claim 1, wherein the sending step comprises:
sending a fuzzy logic processor address; and
encoding the fuzzy logic processor address transmitted in address classes so that the encoding represents one or more fuzzy logic processors.

7. A method according to claim 1 wherein the step of sending data elements comprises incorporating the force coefficients into an address of each respective transmitter.

8. A method according to claim 1 wherein the step of sending data elements comprises incorporating the force coefficients into an address of the at least one fuzzy logic processor.

9. A method of processing information by fuzzy logic comprising:
sending data elements with force coefficients from transmitters to at least one fuzzy logic processor in a data network system where the force coefficients assign a relative importance to the data elements; and
processing the data elements with the at least one fuzzy logic processor on the basis of weighting by the force coefficients to produce a processed signal.

10. A method according to claim 9, wherein the processing step further comprises processing the data elements on the basis of membership functions, and on the basis of conditional rules.

11. A method according to claim 9, further comprising the step of:
sending an address to the at least one fuzzy logic processor which is an address of the transmitter that sends the data elements or an address of the designated fuzzy logic processor; and
encoding the transmitted address in classes of addresses so that this encoding represents the force coefficient.

12. A method according to claim 11, further comprising the step of:
distributing address membership functions as a function of the classes of addresses.

13. A method according to claim 9, wherein the processing step comprises weighting the processed signal by multiplying by the force coefficient.

14. A method according to claim 9, wherein the sending step comprises:
sending a fuzzy logic processor address; and
encoding the fuzzy logic processor address transmitted in address classes so that the encoding represents one or more fuzzy logic processors.

15. A method according to claim 9 wherein the step of sending data elements comprises incorporating the force coefficients into an address of each respective transmitter.

16. A method according to claim 9 wherein the step of sending data elements comprises incorporating the force coefficients into an address of the at least one fuzzy logic processor.

17. A system for processing information by fuzzy logic comprising:
a plurality of transmitters for sending data elements with force coefficients assigning a relative importance to the data elements; and
at least one fuzzy logic processor cooperating with said plurality of transmitters, said at least one fuzzy logic processor for processing the data elements on the basis of weighting by the force coefficients to produce a processed signal.

18. A system according to claim 17, wherein said at least one fuzzy logic processor also processes the data elements on the basis of membership functions, and on the basis of conditional rules.

19. A system according to claim 17, wherein each of said transmitters further
sends an address to the at least one fuzzy logic processor which is an address of the transmitter that sends the data elements or an address of the designated fuzzy logic processor; and
encodes the transmitted address in classes of addresses so that this encoding represents the force coefficient.

20. A system according to claim 17, wherein said at least one fuzzy logic processor weights the processed signal by multiplying by the force coefficient.

21. A system according to claim 17, wherein each of said transmitters further
sends a fuzzy logic processor address; and
encodes the fuzzy logic processor address transmitted in address classes so that the encoding represents one or more fuzzy logic processors.

22. A system according to claim 17 wherein the force coefficients are incorporated into a respective address of each of said plurality of transmitters.

23. A system according to claim 17 wherein the force coefficients are incorporated into an address of the at least one fuzzy logic processor.

24. A system for processing information by fuzzy logic comprising:
a plurality of transmitters for sending data elements with force coefficients assigning a relative importance to the data elements; and
a data network system comprising at least one fuzzy logic processor cooperating with said plurality of transmitters, said at least one fuzzy logic processor processing the data elements on the basis of membership functions, on the basis of conditional rules, and on the basis of weighting by the force coefficients to produce a processed signal.

25. A system according to claim 24, wherein each of said transmitters further sends an address to the at least one fuzzy logic processor which is an address of the transmitter that sends the data elements or an address of the designated fuzzy logic processor and encodes the transmitted address in classes of addresses so that this encoding represents the force coefficient.

26. A system according to claim 24, wherein said at least one fuzzy logic processor weights the processed signal by multiplying by the force coefficient.

27. A system according to claim 24, wherein each of said transmitters further sends a fuzzy logic processor address and encodes the fuzzy logic processor address transmitted in address classes so that the encoding represents one or more fuzzy logic processors.

28. A method of processing information by fuzzy logic comprising:

sending data elements with force coefficients from transmitters to a plurality of fuzzy logic processors where the force coefficients assign a relative importance to the data elements, each of the fuzzy logic processors being responsive to a range of fuzzy logic processor addresses where the ranges of fuzzy logic processor addresses are overlapping;

sending a fuzzy logic processor address; and processing the data elements with each fuzzy logic processor having the fuzzy logic processor address in its respective range of fuzzy logic processor addresses on the basis of membership functions, on the basis of conditional rules, and on the basis of weighting by the force coefficients to produce a processed signal.

29. The method according to claim 28 wherein sending data elements is implemented in a network system.

30. The method according to claim 29 further comprising encoding the fuzzy logic processor address in address classes so that the encoding represents one or more fuzzy logic processors.

31. The method according to claim 30 further comprising distributing address membership functions as a function of the classes of addresses.

32. The method according to claim 28 wherein processing comprises weighting the processed signal by multiplying by the force coefficients.

33. A method of processing information by fuzzy logic comprising:

sending data elements with force coefficients from transmitters to at least one fuzzy logic processor, the force coefficients adopting probability values different than one and assigning a relative importance to the data elements; and processing the data elements with the at least one fuzzy logic processor on the basis of membership functions, on the basis of conditional rules, and on the basis of weighting by the force coefficients to produce a processed signal.

34. The method according to claim 33 wherein sending data elements is implemented in a network system.

35. The method according to claim 33 further comprising:

sending an address to the at least one fuzzy logic processor which is an address of the transmitter that sends the data elements or an address of the designated fuzzy logic processor; and encoding the transmitted address in classes of addresses so that this encoding represents the force coefficient.

36. The method according to claim 35 further comprising distributing address membership functions as a function of the classes of addresses.

37. The method according to claim 33 wherein processing comprises weighting the processed signal by multiplying by the force coefficients.

38. The method according to claim 33 wherein sending comprises:

sending a fuzzy logic processor address; and encoding the fuzzy logic processor address transmitted in address classes so that the encoding represents one or more fuzzy logic processors.

39. A method of processing information by fuzzy logic comprising:

sending data elements with force coefficients from transmitters to at least one fuzzy logic processor where the force coefficients assign a relative importance to the data elements; and processing the data elements with the at least one fuzzy logic processor on the basis of membership functions, on the basis of conditional rules, and on the basis of weighting by the force coefficients to produce a processed signal, the force coefficients having probability values corresponding to a trapezoidal shape of the membership functions.

40. The method according to claim 39 wherein the step of sending data elements is implemented in a network system.

41. The method according to claim 40 further comprising:

sending an address to the at least one fuzzy logic processor which is an address of the transmitter that sends the data elements or an address of the designated fuzzy logic processor; and encoding the transmitted address in classes of addresses so that this encoding represents the force coefficient.

42. The method according to claim 41 further comprising distributing address membership functions as a function of the classes of addresses.

43. The method according to claim 39 wherein processing comprises weighting the processed signal by multiplying by the force coefficients.

44. The method according to claim 39 wherein sending comprises:

sending a fuzzy logic processor address; and encoding the fuzzy logic processor address transmitted in address classes so that the encoding represents one or more fuzzy logic processors.

* * * * *